Aug. 30, 1932.   G. A. PAGE, JR   1,874,605

OIL TANK

Filed May 23, 1930

INVENTOR
GEORGE A. PAGE Jr.
BY
ATTORNEY

Patented Aug. 30, 1932

1,874,605

UNITED STATES PATENT OFFICE

GEORGE A. PAGE, JR., OF FREEPORT, NEW YORK, ASSIGNOR TO CURTISS AEROPLANE & MOTOR COMPANY, INC., A CORPORATION OF NEW YORK

OIL TANK

Application filed May 23, 1930. Serial No. 455,008.

My invention relates to lubrication systems for internal combustion engines and especially to lubrication systems for engines of the type which are used in aircraft. Specifically, it relates to an improved oil tank to be used in such a lubrication system.

It was usually necessary prior to my invention, that motors for aircraft should be run for a considerable period of time before the flight in order that the parts and especially the oil thereof should be warmed sufficiently. This warming up process was necessary in order to avoid injury to the motor by running it at operating speeds before the oil became sufficiently warmed. Also in cold weather it was often very difficult to start aeronautical motors due to the facts that before starting a motor, the oil is usually cold and therefore relatively viscous and difficult to move, and that substantially the whole quantity of oil had to be warmed before the engine became relatively easy to turn over.

One of the objects of my invention is to decrease wear upon such motors incident to using them at the usual operating speeds with the oil improperly warmed.

A further object of my invention is to decrease the difficulties of starting aeronautical motors in cold weather.

Further objects will be apparent from a reading of the subjoined specification and claims and from a consideration of the accompanying drawing.

In order to explain the invention more clearly, one embodiment thereof is shown in said drawing, in which.

Figure 2:
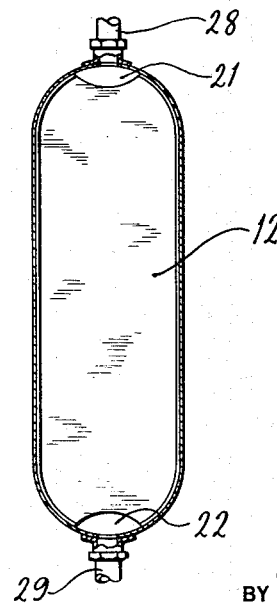
Fig. 2 is a section along the line 2—2 of Fig. 1.

Referring in detail to the drawing wherein like reference numerals are used to designate the same or similar parts, I have shown an oil tank generally designated 11 and of substantially conventional shape. Therein, I have provided baffles 12, 13, 14 and 15. The baffles 12 and 13 are alike and baffle 12 is shown more clearly in Fig. 2. As shown these baffles are of substantially the same shape as the tank and are so situated as to separate the tank into several compartments or sections such as 16 and 17. Together with baffle 14 they also form section 18. Both baffles are provided with small openings such as the openings 21 and 22 by which oil may at times flow from the compartments 16 and 18 into the compartment 17 or from the compartment 17 into the compartments 18 and 16. As shown, these openings are of constricted size so that there will never be an excessive amount of oil flowing from the compartments 18 and 16 into the compartment 17. Moreover while the oil is cold the size of the openings substantially prevents the passage of any oil from compartments 18 and 16 into compartment 17. However, as soon as the oil becomes warm the size of the holes 21 and 22 is sufficient to supply any oil needed for replenishing the oil destroyed by operation of the motor.

Figure 3:
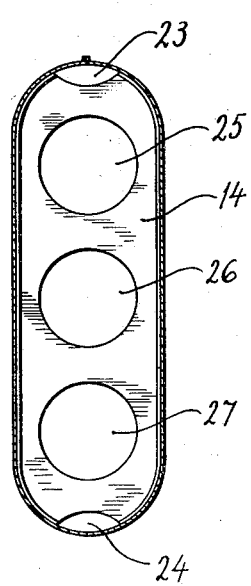
Fig. 3 is a section taken along the line 3—3 of Fig. 1.

The baffles 14 and 15 are alike and baffle 14 is shown more clearly in Fig. 3. They separate the tank to form two additional sections or compartments 19 and 20. They are provided with holes 23 and 24 shaped similarly to openings 21 and 22 and in addition have relatively large holes such as holes 25, 26 and 27. Thereby, substantially free movement of oil is allowed between the compartments 18, 19 and 20. The baffles 14 and 15, however, prevent undue sloshing of the oil within the tank and consequent changes in the center of gravity which might have a harmful influence upon the flight of the airplane. Moreover, the baffles 14 and 15 as well as the baffles 12 and 13 provide support for the walls of the tank and add strength thereto.

Figure 1:
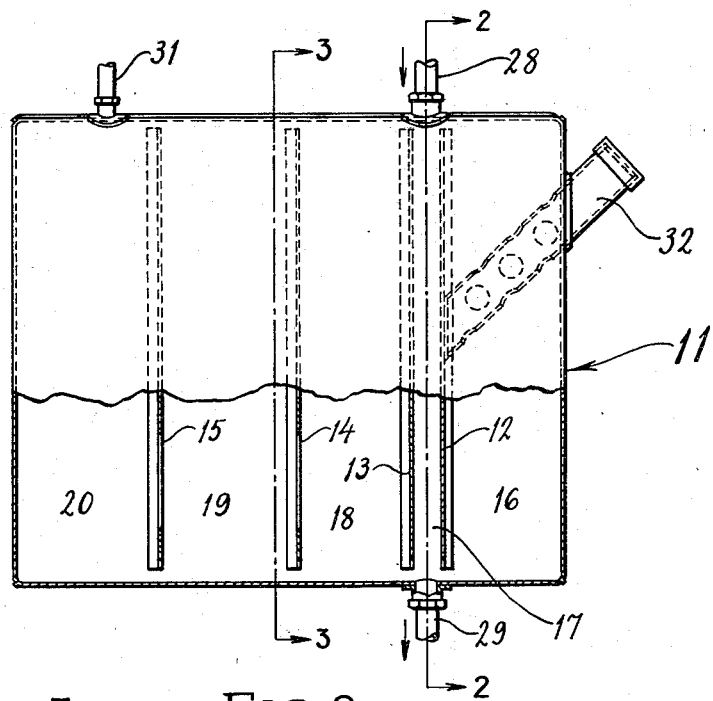
Fig. 1 is an elevation of an oil tank constructed according to my invention but with parts broken away.

As may be seen from an inspection of Fig. 1 the baffles 12 and 13 are positioned comparatively close together so that the compartment 17 is of relatively narrow width. Aligned with the compartment 17 is an inlet conduit 28 and an outlet conduit 29 by which oil is delivered from and to the engine, respectively. It may be thus seen that until the oil becomes warm, substantially the only oil supplied to the engine will be that which is in the relatively small compartment 17 and in the pipes 28 and 29. It can be understood that this oil will be very quickly raised to operating temperatures and long delays waiting for the oil to warm will be obviated. As the oil in the other compartments becomes warmer through the conduction of heat through the baffles 12 and 13 and through convection in the compartments 16, 18, 19 and 20, more oil may be drawn in through the small openings 21 and 22 to replenish any used oil. A vent tube 31 and a filler tube 32 are also provided. The latter extends through the compartment 16 and is secured to the baffle 12 for support but does not extend through the baffle.

The operation of a lubrication system constructed according to my invention is substantially as follows: As soon as the motor is started, oil is pumped from the compartment 17 through the conduit 29 to the motor and there is warmed, as it is used, by the heat of the motor. Thereafter, it is returned to the compartment 17 through the conduit 28 and passes down and again is drawn through the motor by the pump. Thus, the small quantity of oil which is in the compartment 17, the conduits 28 and 29, and the motor, will be warmed in a relatively short time and it will not be necessary to run the motor for so long a time in the warming up process. The oil is soon warmed to a temperature which allows operation of the motor at usual operating speeds and the aerial vehicle may take off. Thereafter, the oil in the compartments 16, 18, 19 and 20 is warmed by conduction and convection and will be drawn in and used to replenish the oil used up in the operation of the motor.

I have shown the tank so constructed that when the motor is cold substantially all of the oil passes between the baffles 12 and 13. It is clear that a pipe having perforations of suitable size might be substituted for the baffles 12 and 13 without departing from the spirit of the invention. Therefore, it is intended that such a construction should be covered by the appended claims.

It is to be understood, moreover, that the above described embodiment of the invention is for the purpose of illustration only and various other changes may be made therein without departing from the spirit and scope of the invention.

I claim as my invention:

1. In a lubrication system, a tank having aligned inlet and outlet openings, and a pair of baffles within said tank substantially aligned with the walls of said openings at substantially diametrically opposed points.

2. In a lubrication system, an oil tank provided with aligned inlet and outlet openings, inlet and outlet tubes connected to said openings respectively and a pair of baffles substantially aligned with the walls of said openings at substantially diametrically opposed points and said tubes.

3. In a lubrication system, a tank having aligned inlet and outlet openings, and a pair of baffles within said tank substantially aligned with the walls of said openings at substantially diametrically opposed points and separating the tank into a plurality of sections one of which is located between the baffles and communicates with the inlet and outlet openings, said baffles being provided with openings leading to other sections of said tank at the top and bottom of said baffles only.

4. A tank having aligned inlet and outlet openings, a pair of baffles within the tank substantially aligned with the walls of said openings at substantially diametrically opposed points, whereby a compartment is formed between said baffles, and a filler tube connected to one of said baffles outside of said compartment to mutually interbrace one another.

5. In a lubrication system, an oil tank, aligned inlet and outlet tubes connected thereto, and a pair of baffles separating the section of the tank into which both the inlet and outlet tubes are connected from the rest of the tank the baffles being aligned with the sides of the inlet and outlet tubes.

6. In a lubrication system; an oil tank; aligned inlet and outlet tubes connected thereto; a pair of baffles separating the section of the tank into which both the inlet and outlet tubes are connected, from the rest of the tank; and additional baffles provided to form other separate compartments within the tank.

7. In a lubrication system; an oil tank having inlet and outlet openings; means within the tank for dividing the tank into a plurality of sections, including an inner section into which the inlet and outlet openings directly open and an outer section into which said openings do not directly open, and for substantially preventing passage of cold oil from said outer section into said inner section, while allowing passage of warm oil from said outer section into said inner section.

8. In a lubrication system; an oil tank, aligned inlet and outlet openings communicating therewith; and means interposed in said tank, for dividing the tank into a plurality of sections including an inner section into which open the inlet and outlet openings and outer sections positioned on opposite sides thereof, and for preventing the free passage of cold oil from said outer sections to the inner section while allowing substantially free passage of warm oil between said sections.

9. A tank comprising; a casing having walls; a baffle plate positioned within said casing; a filler tube passing through an outer wall of said casing and extending within the tank to contact with the baffle plate, said filler tube being provided with openings intermediate the casing wall and the baffle plate; and means for securing said filler tube to the casing wall and to the baffle plate, whereby a firm support for said filler tube is secured.

10. In a lubrication system; a tank having aligned inlet and outlet openings adapted to communicate with the crank case of an internal combustion engine, and a relatively narrow conduit having its opposite ends communicating with said inlet and outlet openings respectively.

11. In a lubrication system, a tank having aligned inlet and outlet openings, a pair of baffles each one of which is disposed on a side of an axis passing through the center of said openings substantially diametrically opposite to the side of said axis on which the other baffle is disposed, said baffles extending to points adjacent said openings.

In testimony whereof I hereunto affix my signature.

GEORGE A. PAGE, Jr.